P. DE PFYFFER.
BUFFER FOR VEHICLE WHEELS.
APPLICATION FILED APR. 27, 1911.
1,130,927.
Patented Mar. 9, 1915.
2 SHEETS—SHEET 1.
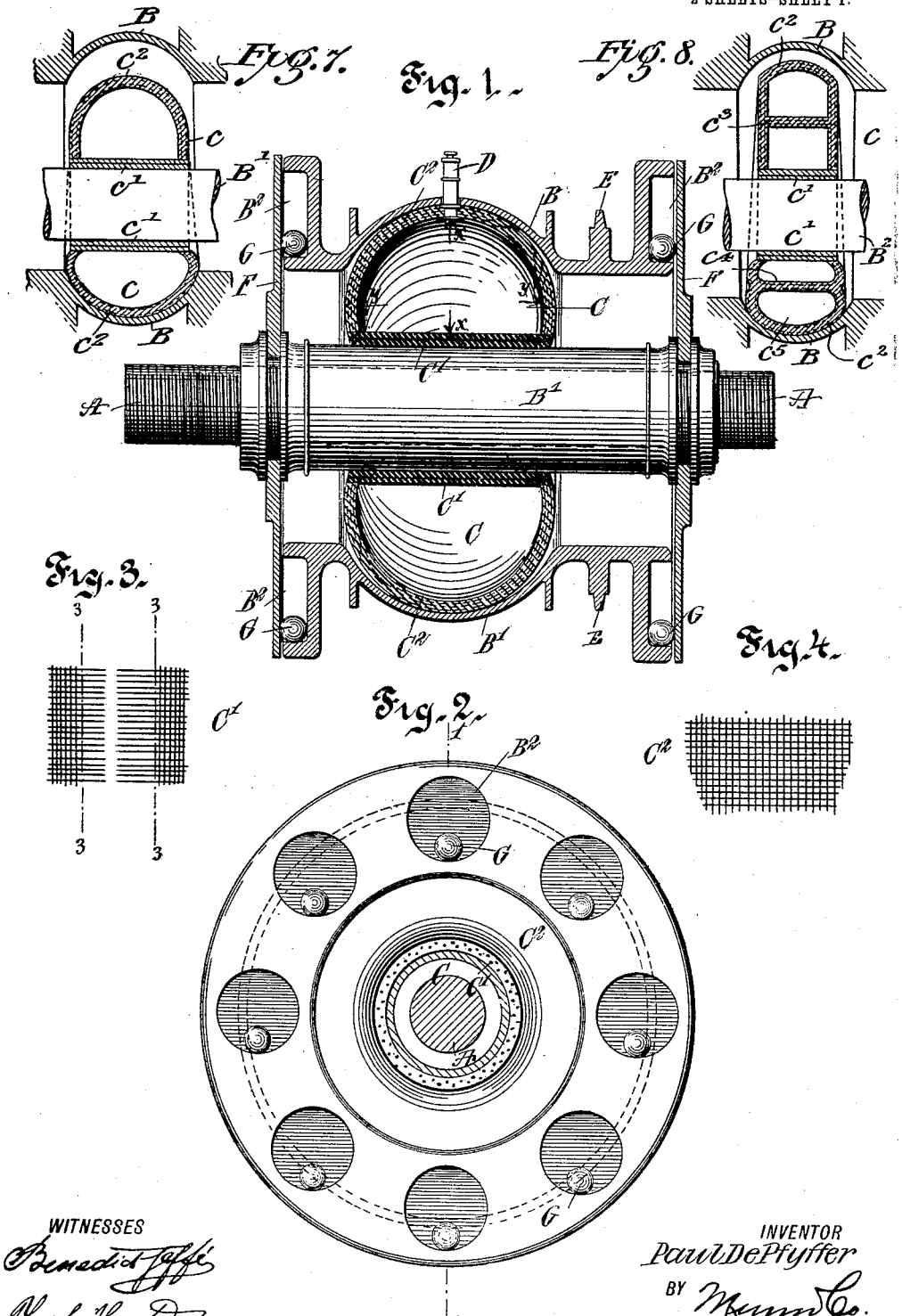
WITNESSES
INVENTOR
Paul De Pfyffer
BY
ATTORNEYS
THE NORRIS PETERS CO., PHOTO-LITHO., WASHINGTON, D. C.

P. DE PFYFFER.
BUFFER FOR VEHICLE WHEELS.
APPLICATION FILED APR. 27, 1911.
1,130,927.
Patented Mar. 9, 1915.
2 SHEETS—SHEET 2.
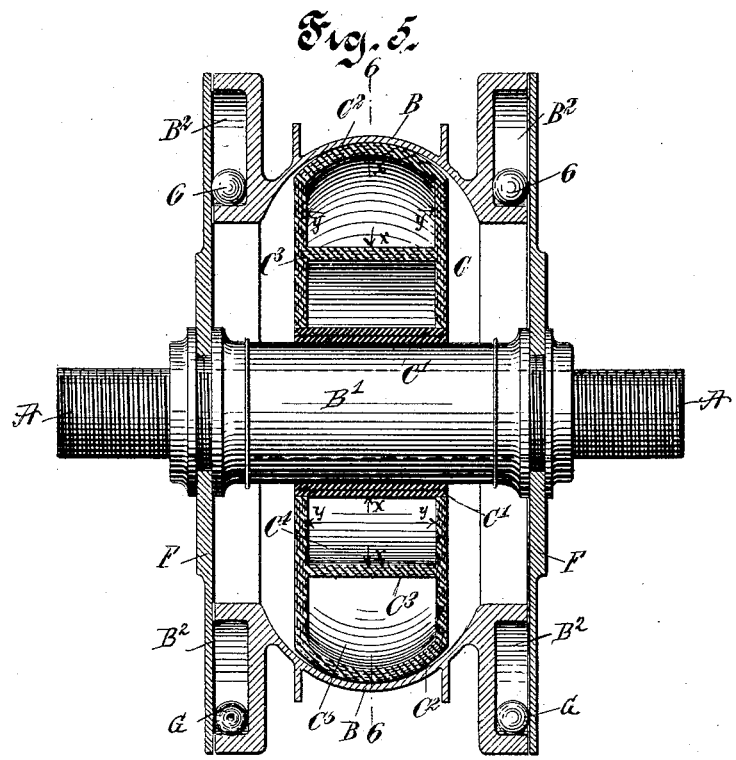
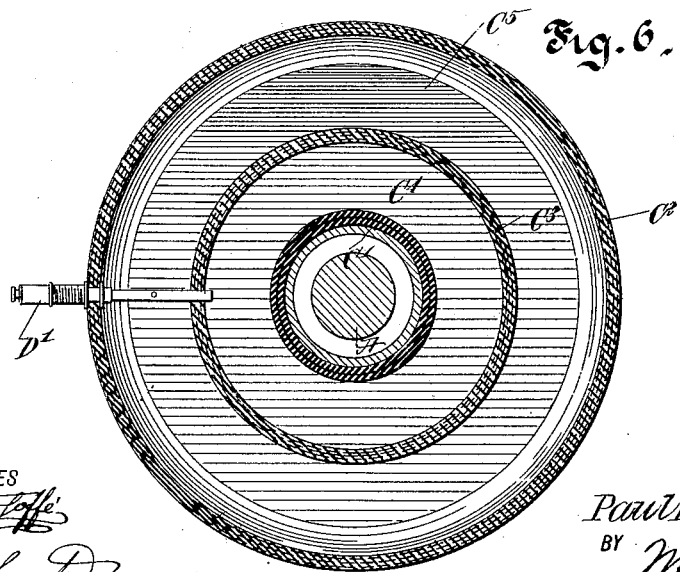

UNITED STATES PATENT OFFICE.

PAUL DE PFYFFER, OF KELOWNA, BRITISH COLUMBIA, CANADA.

BUFFER FOR VEHICLE-WHEELS.

1,130,927. Specification of Letters Patent. Patented Mar. 9, 1915.

Application filed April 27, 1911. Serial No. 623,610.

*To all whom it may concern:*

Be it known that I, PAUL DE PFYFFER, a citizen of Switzerland, and a resident of Kelowna, in the Province of British Columbia, Dominion of Canada, have invented a new and Improved Buffer for Vehicle-Wheels, of which the following is a full, clear, and exact description.

The object of the invention is to provide a new and improved buffer, more especially designed for use between the members of the sectional hub of a vehicle wheel, to take up jolts and jars on the wheel when passing over rough surfaces, and arranged to insure a firmer hold on the hub on inflation of the buffer. For the purpose mentioned, use is made of a pneumatic buffer of annular or ring shape, and interposed between the members of a sectional hub of the wheel, the buffer having an inner portion of a material dilatable radially and held against axial dilation, the remaining outer portion being of a flexible material held against dilation in any direction.

A practical embodiment of the invention is represented in the accompanying drawings forming a part of this specification, in which similar characters of reference indicate corresponding parts in all the views.

Figure 1 is a cross section of the buffer, arranged between the members of a sectional vehicle hub; Fig. 2 is a side elevation of the buffer in position on the hub, the end plate being removed; Fig. 3 is an enlarged plan view of the reinforcement for the inner portion of the buffer; Fig. 4 is a like view of the reinforcement for the outer portion of the buffer; Fig. 5 is a cross section of the buffer provided with a partition to form a plurality of cells or compartments in the buffer, the latter being shown in position between the members of the sectional hub of a non-driven vehicle wheel; Fig. 6 is a sectional side elevation of the buffer shown in Fig. 5, the section being on the line 6—6 of Fig. 5; and Figs. 7 and 8 are vertical sections through certain forms of the buffer illustrating the same under pressure.

On the axle A of the vehicle is mounted to turn in the usual manner the wheel hub formed of an outer or spoke section or member B, an inner or axle section or member B' and a buffer or cushion C interposed between the said sections or members B and B'. The buffer or cushion C is in the form of a tubular ring having an inner or an axial portion C' and a remaining outer portion $C^2$, of which the inner portion C' is made of a material dilatable radially but held against axial dilation, while the outer portion $C^2$ is of a flexible material held against dilation in any direction. In practice, the inner portion C' may be made of soft rubber reinforced in a direction parallel to the axis of the axle A, by the use of a fabric having spaced threads extending longitudinally and terminating in selvedges at the ends, which selvedges, however, project beyond the sides of the inner portion C' when making the buffer and are finally cut off along the lines 3—3 of Fig. 3. The outer portion $C^2$ may be made of rubber reinforced by a fabric having both warp and weft threads, so as to render the outer portion $C^2$ flexible but holding the same against being dilated. The radial diameter $x$—$x$ of the cross sectional area of the buffer or cushion is somewhat less than the diameter $y$—$y$ parallel to the axis of the hub. When the buffer or cushion is in position between the hub sections B and B' then the inner portion C' is parallel to the axis of the hub and snugly fits onto the inner hub section B', while the outer portion $C^2$ is arched and fits into a correspondingly shaped concave portion of the outer hub section B. A valve D is connected with the buffer or cushion C so as to permit of inflating the buffer or cushion with air by the aid of a suitable pump or other means. When the buffer or cushion C is in position between the hub sections B and B', and air is pumped into the buffer by way of valve D, then the inner portion C' is forced in firm contact with the peripheral face of the hub section B' as the said portion C' is dilatable radially and held against extension in a direction parallel to the axis of the wheel, and the outer portion $C^2$ is held against dilation in any direction, and by the reinforcement of the inner portion C' is held against extension in a direction parallel to the axis of the wheel. It is understood that the rubbers of the inner and outer portions C' and $C^2$ are homogeneously united when making the buffer or cushion in the mold or otherwise.

It is understood that the reason for making the radial diameter of the cross section of the buffer C less than the diameter paralleled to the axis is owing to the fact that a pneumatic cushion, made of an elastic or dilatable material, on being strongly inflated, takes the form of a ball or sphere, even if such cushion had, previous to inflation, a cross section of oval, triangular, quadratic or other shape. From this fact it is evident that when the pneumatic buffer C, is in position on the hub section B' and is inflated, it has the tendency to dilate in that direction where it differs most from the circular shape. It is further understood that the extension of the buffer C is forced in the centripetal (hence also radial) direction.

It will be at once apparent that the purpose of forming the inner buffer portion C' without longitudinal reinforcement, is to permit of the enlargement of this (the inner circumferential) portion of the buffer, such being of course necessary in order to allow of the disposition of the buffer on a hub in the manner shown in Fig. 1. The buffer is, on the other hand, prevented from enlargement in a direction parallel to the hub after disposition thereon, by the transverse reinforcement of its inner portion C', it being borne in mind that the outer portion C is inextensible in any direction. Thus the buffer is so constructed that after disposal on a hub, it directs all the pressure of its air in a centripetal direction.

As shown in the drawings the hub section B is provided with a sprocket wheel E for connection with the motor for propelling the vehicle, and the ends of the hub section B are provided with circular recesses B² each containing a ball G abutting against the inner face of a disk F rotating with the hub section B' and forming with the balls G a thrust bearing.

As shown in Figs. 5 and 6, the buffer or cushion C is provided with an annular partition, C³ of the same material as the outer portion C², the said partition C³ dividing the interior of the buffer or cushion into concentric compartments C⁴ and C⁵, each less in height than in width. In this case, the valve D' (see Fig. 6), extends into the compartment C⁴ and also discharges into the compartment C⁵ to fill the said compartments with compressed air, otherwise the construction is the same as above described in reference to Figs. 1, 2, 3 and 4.

Fig. 7 shows a single compartment buffer, which when manufactured is approximately cylindrical in cross section, and when in position on the hub section B' the portion C' extends parallel to the axis of the hub section B' and fits snugly thereon. It is understood that in the form shown in Fig. 1, the portion C' is parallel to the axis of the buffer when manufactured.

Fig. 8 discloses a two-compartment form, in which the portion C' when manufactured is similar to the portion C' shown in Fig. 7, and when in use on the hub section the portion C' is parallel, to snugly fit onto the peripheral face of the hub section B'.

It is understood that instead of one partition C³ two or more such partitions may be employed.

From the foregoing it will be seen that the pneumatic ring-shaped buffer, introduced between the hub sections B and B' of the vehicle wheel, on being inflated, takes a bigger extension in a radial direction than parallel to the axle, and this extension becomes more pronounced as the inflation is increased. It will also be noticed that by inflating the pneumatic ring-shaped buffer, the inner diameter of the inner portion C' tends to become smaller on the increase of inflation so that the inner portion C' takes a firm hold on the peripheral face of the hub section B'.

It is understood that when the vehicle wheel is in use and subjected to a load then a pressure is exerted against the inner hub section B' from above, while a pressure is exerted against the outer hub section B from below by way of the spokes and the wheel rim or tire in contact with the ground, whereby the hub sections B and B' move into eccentric positions one relative to the other. Thus, when under load and the outer hub section is forced to a position eccentric with respect to the inner hub section, the lower half of the buffer is distorted by compression between the hub sections, although both this portion and the upper portion of the buffer continue to press inwardly against the inner hub portion.

Having thus described my invention, I claim as new and desire to secure by Letters Patent:

1. As an article of manufacture, a buffer for a vehicle wheel to be used intermediate the sections of a two part hub, consisting of a tubular ring having an inner axle portion of rubber reinforced by spaced threads running in a direction parallel to the axis of the axle to hold the said inner portion against stretching in the said axial direction, and to allow the said inner portion to dilate radially, and an outer portion of rubber reinforced by an inelastic fabric material to render the said outer portion flexible and to hold it against dilation.

2. As an article of manufacture, a buffer for a vehicle wheel to be used intermediate the sections of a two part hub, consisting of a tubular ring having an inner axle portion of rubber reinforced by spaced threads running in a direction parallel to the axis of the axle to hold the said inner portion against stretching in the said axial direction, and to allow the said inner portion to dilate radially, an outer portion of rubber reinforced by a flexible inelastic fabric material to render the said outer portion flexible and to hold it against dilation, and annular partitions within the ring extending axially and forming concentric compartments in the ring, the partition being formed by a flexible material inelastically reinforced held against dilation.

In testimony whereof I have signed my name to this specification in the presence of two subscribing witnesses.

PAUL DE PFYFFER.

Witnesses:
THOMAS LAWSON,
ALBERT STANLEY WADE.

Copies of this patent may be obtained for five cents each, by addressing the "Commissioner of Patents, Washington, D. C."